March 20, 1928.
M. F. WIELAGE
SOLDERING DEVICE
Filed April 28, 1927
1,662,945
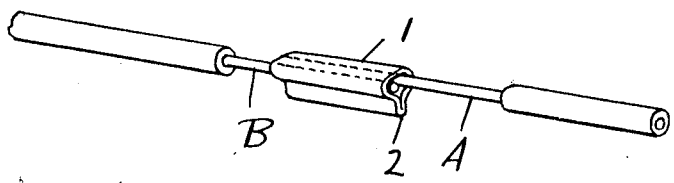
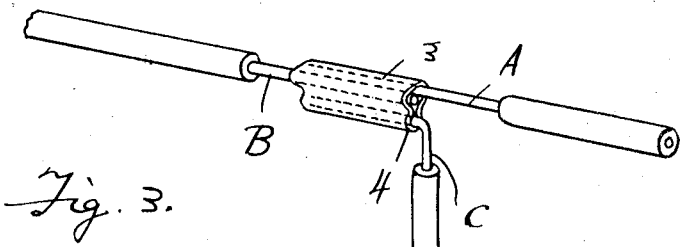
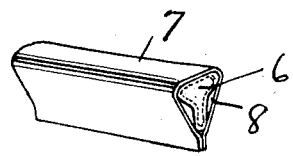
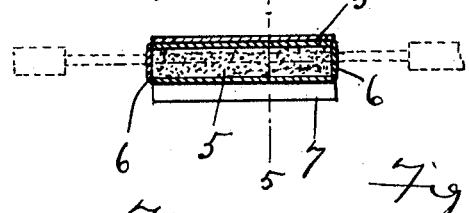
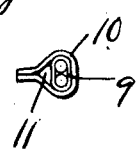
Inventor
Marcus Frans Wielage
By Clarence A O'Brien
Attorney Patented Mar. 20, 1928.

1,662,945

UNITED STATES PATENT OFFICE.

MARCUS FRANS WIELAGE, OF MIAMI, FLORIDA.

SOLDERING DEVICE.

Application filed April 28, 1927. Serial No. 187,294.

The present invention relates to improvements in soldering devices and has for its principal object to provide as an article of manufacture a soldering device for securing the adjacent ends of two or more wires, rods, or the like together without necessitating the employment of a blow-torch or soldering iron.

One of the important objects of the present invention is to provide a soldering device which includes a hollow open ended member of highly conductive material which is filled with a soldering paste in which composition is incorporated a quantity of flux, the ends of the wires which are to be united extending into the soldering paste through the respective ends of the open ended conductive member, a covering of highly inflammable material being provided over the highly conductive hollow member whereby the heat generated by the burning of the inflammable covering will act upon the soldering paste to effect the cleaning of the adjacent ends of the wires and also unite the same together in the hollow member whereby to form a permanent joint or connection between said wires.

A still further object is to provide a soldering device of the above mentioned character wherein the ends of the hollow highly conductive member are sealed with puncturable closures to prevent the soldering paste from flowing out of the hollow member.

A still further object is to provide a soldering device of the above mentioned character which is simple in construction, inexpensive, strong, and durable and further well adapted to the purpose for which it is designed.

Other objects and advantages of the invention will become apparent from the following description taken in connection with the accompanying drawing.

In the accompanying drawing wherein like reference characters indicate corresponding parts throughout the several views:

Figure 1 is a perspective view of the metallic tube showing the adjacent ends of two wires arranged within the tube.

Figure 2 is a similar view showing the manner in which three wires are arranged within the tube.

Figure 3 is a detail perspective view of the soldering device.

Figure 4 is a longitudinal sectional view therethrough.

Figure 5 is a cross sectional view taken on the line 5—5 of Figure 4.

Figure 6 is an edge elevation of a modification of the tube showing the inflammable covering therearound.

Figure 7 is an end elevation of the soldering device used where three wires are to be connected together, and Figure 8 is a cross sectional view through the form of tube used for connecting two ends of a pair of wires together.

In the drawing wherein for the purpose of illustration is shown the preferred embodiment of the invention, the numeral 1 designates an elongated tube which is preferably formed of copper whereby the same will provide an excellent heat conductor. The tube is open at its respective ends and when the same is used for uniting or connecting the adjacent ends of two wires together, the same is bent in the shape as shown in Figure 1.

If the tube is to be used for uniting three wires, then the same is formed in the manner as shown in Figure 2. With reference now to Figure 1, it will be observed that the upper portion of the tube will receive the adjacent ends A and B of two wires and the lower portion of the tube will be pressed together as illustrated at 2.

In Figure 2, the upper portion of the tube 3 is of a width capable of receiving the adjacent ends of one pair of wires. The lower portion of this tube is formed with the longitudinally extending loop 4 for receiving the free end C of a branch or third wire.

The tube in each instance is filled with a soldering paste designated generally by the numeral 5, and incorporated in this soldering paste is a quantity of flux which acts as a cleaning agent for the scraped ends of the wires which are to be united together in the tube. The paste is of such consistency as to permit the ends of the wires which are to be united to be readily and easily inserted therein.

For the purpose of preventing the soldering paste from flowing out through the open ends of the tube, the open ends of the tube are sealed by the provision of puncturable closures 6. These closures are preferably formed of wax and the scraped ends of the wires which are to be united may readily pierce these closures prior to inserting the ends of the wires in the soldering paste within the tube.

The tube 1 is then dipped in shellac and a strip of paper or other material containing on it, or in it a mixture of high caloric power when burned is placed over this tube to form a highly inflammable covering which is designated by the numeral 7. The ends of the strip of paper constituting the inflammable covering are secured together in any appropriate manner and the covering is disposed over the tube in such a manner as to provide air passages between the tube and the covering as indicated at 8 with reference more particularly to Figures 3, 5, 6 and 7 in the drawing, thereby permitting air to circulate between the covering and the tube to assist in the proper burning of the covering.

In using the soldering device, the article as shown in Figure 3 of the drawing comprises the entire device and the ends of the wires which are to be soldered together are inserted into the soldering paste 5 by piercing the puncturable closures 6. The inflammable cover 7 is then ignited by using a match and as the inflammable covering burns, heat will be generated and the copper tube 1 which is a relatively high conductor of heat will transmit the heat to the soldering paste and the flux incorporated therein whereby the composition within the tube will be melted and after the flux has cleaned the scraped ends of the wires, the soldering paste will unite the wires in the tube either by uniting both of the wires to the tube or by uniting one of the wires with the tube and simultaneously uniting the wires together. In this manner, a permanent connection between the wires and the tube will be provided.

The provision of a soldering device of the above mentioned character will save considerable expense in soldering the ends of wires or other members which are to be connected together and furthermore by employing a soldering device of the character such as is embodied in the present invention, it will not be necessary to use a blow torch or soldering iron such as must now be employed while performing a soldering operation.

Also by providing a soldering device of the character above described, the same can be easily carried around and due to its simplicity, the device can be manufactured at a very low cost. Furthermore, the soldering device will at all times be positive and efficient in carrying out the purposes for which it is designed.

In Figure 6 of the drawing there is shown a modification of the tube wherein the same is of such shape as to permit the adjacent ends of two wires to fit snugly therein, the tube being designated by the numeral 9, and it is of course to be understood that the tube is filled with a soldering paste into which the adjacent ends of the wires extend. A covering of inflammable material 10 is disposed around this tube 9, and an air space 11 is provided between a portion of the covering and the tube.

In Figure 8 a still further modification of the tube is shown where the same is adapted to be used for cooperation with adjacent ends of two wires and this tube is designated by the numeral 12.

While I have shown the preferred embodiment of my invention it is to be understood that minor changes in the size, shape and arrangement of parts may be resorted to without departing from the spirit of the invention and the scope of the appended claim.

Having thus described the invention, what I claim is:—

In a soldering device of the class described, a tube open at its respective ends, a soldering paste filling for the tube, puncturable closures for the open ends of the tube, and a covering of inflammable material for the tube, said covering being spaced from the tube to provide an air passage.

In testimony whereof I affix my signature.

MARCUS FRANS WIELAGE.